(12) United States Patent
Simmons et al.

(10) Patent No.: US 9,841,765 B2
(45) Date of Patent: Dec. 12, 2017

(54) CURB DETECTION FOR VEHICLE PARKING

(71) Applicant: Ford Global Technologies, LLC, Dearborn, MI (US)

(72) Inventors: Kyle Simmons, Royal Oak, MI (US); Li Xu, Northville, MI (US); Eric Hongtei Tseng, Canton, MI (US); Thomas Edward Pilutti, Ann Arbor, MI (US); Douglas Blue, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/069,361

(22) Filed: Mar. 14, 2016

(65) Prior Publication Data
US 2017/0261994 A1   Sep. 14, 2017

(51) Int. Cl.
*B62D 5/22* (2006.01)
*G05D 1/02* (2006.01)
(Continued)

(52) U.S. Cl.
CPC ......... *G05D 1/0272* (2013.01); *B62D 15/027* (2013.01); *G05D 1/0891* (2013.01)

(58) Field of Classification Search
CPC ... G01N 29/04; B60T 8/00; B60T 7/22; G01S 13/93; G01S 7/52006; B60W 30/06;
(Continued)

(56) References Cited

U.S. PATENT DOCUMENTS 5,261,503 A * 11/1993 Yasui .................. B62D 5/22
                                                       180/197
6,105,703 A *  8/2000 Kuroda ................ B60K 17/35
                                                       180/248
(Continued)

FOREIGN PATENT DOCUMENTS

EP     2098844 A1    9/2009
EP     1386805 B1    6/2011
(Continued)

OTHER PUBLICATIONS

Christoph Mertz et al., Collision Warning and Sensor Data Processing in Urban Areas, Proceedings of the 5th International Conference on ITS Telecommunications, Jun. 2005, pp. 73-78.
(Continued)

*Primary Examiner* — Yuri Kan
(74) *Attorney, Agent, or Firm* — James P. Muraff; Neal, Gerber & Eisenberg LLP

(57) ABSTRACT

Systems and methods for curb detection for parking are disclosed. An example vehicle parking assist system includes a processor and memory. An example program stored in the memory is configured to move a vehicle using a set of maneuvers to park the vehicle in a parking space based on an estimated location of a curb. The example program is also configured to compare a first yaw rate to a reference yaw rate to detect when the vehicle contacts the curb. Additionally, the example program is configured to move the vehicle using an adjusted set of maneuvers based on an actual location of the curb.

17 Claims, 7 Drawing Sheets

(51) Int. Cl.
*G05D 1/08* (2006.01)
*B62D 15/02* (2006.01)

(58) Field of Classification Search
CPC ......... B60W 40/114; G08G 1/14; B62D 5/22; G06K 9/00812; B60K 17/35; G05D 1/0272
See application file for complete search history.

(56) References Cited

U.S. PATENT DOCUMENTS

| | | | |
|---|---|---|---|
| 6,289,281 B1 * | 9/2001 | Shinmura | B60T 7/22 303/140 |
| 6,438,463 B1 | 8/2002 | Tobaru et al. | |
| 6,904,350 B2 | 6/2005 | Lu et al. | |
| 7,653,471 B2 | 1/2010 | Mattson et al. | |
| 8,081,539 B2 * | 12/2011 | Faber | G01S 7/52006 367/902 |
| 8,364,365 B2 | 1/2013 | Brewer et al. | |
| 2007/0282499 A1 * | 12/2007 | Maeda | B60T 7/22 701/41 |
| 2008/0291276 A1 | 11/2008 | Randler | |
| 2011/0148663 A1 | 6/2011 | Barth | |
| 2014/0371972 A1 | 12/2014 | Jecker et al. | |
| 2016/0078763 A1 * | 3/2016 | Kiyokawa | G06K 9/00812 382/104 |
| 2016/0229394 A1 * | 8/2016 | Fujii | B60W 40/114 |
| 2017/0008515 A1 * | 1/2017 | Seo | B60W 30/06 |

FOREIGN PATENT DOCUMENTS

| | | | | |
|---|---|---|---|---|
| EP | 2689990 A2 | | 1/2014 | |
| GB | 2486814 A | | 6/2012 | |
| GB | 2514473 A | | 11/2014 | |
| IT | EP 2148220 A1 | * | 1/2010 | ........... G01S 13/931 |
| IT | EP-2148220 A1 | * | 1/2010 | ........... G01S 13/931 |
| JP | EP 1129917 A2 | * | 9/2001 | ................ B60T 7/22 |
| JP | EP-1129917 A2 | * | 9/2001 | ................ B60T 7/22 |

OTHER PUBLICATIONS

Christopher R. Carlson et al., Error Sources when Land Vehicle Dead Reckoning with Differential Wheelspeeds, Stanford University, Submitted Feb. 2003, Revised Sep. 2003, 28 pages.

Search Report dated Aug. 23, 2017 for GB Patent Application No. GB 1704037.9 (4 Pages).

* cited by examiner

US 9,841,765 B2

CURB DETECTION FOR VEHICLE PARKING

TECHNICAL FIELD

The present disclosure generally relates to assisted parking and, more specifically, curb detection for vehicle parking.

BACKGROUND

Semi-autonomous vehicles are equipped with systems, such as an assisted parking module, that assist with certain driving tasks when activated by a driver. The assisted parking module assists the driver in sensing a potential parking space, planning a path into the parking space, and exercising lateral, longitudinal and transmission gear control to maneuver the vehicle into the parking space. An accurate estimation of the current vehicle position and heading angle is important for path planning, and lateral and longitudinal control tasks. Traditionally, this is done using odometry and/or a yaw rate sensor. Odometry determines the distance traveled based on the speed of the wheels and the circumference of the wheels.

On narrow streets, parking a vehicle on the street often involves parking so that a portion of the vehicle is on the street and a portion of the vehicle in on the curb. However, curbs can make odometry inaccurate. Thus, curbs cause difficulty for path planning, and lateral and longitudinal control tasks.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Exemplary embodiments provide systems and methods for curb detection for parking. An example vehicle parking assist system includes a processor and memory. An example program stored in the memory is configured to move a vehicle using a set of maneuvers to park the vehicle in a parking space based on an estimated location of a curb. The example program is also configured to compare a first yaw rate to a reference yaw rate to detect when the vehicle contacts the curb. Additionally, the example program is configured to move the vehicle using an adjusted set of maneuvers based on an actual location of the curb.

An example method to assist parking a vehicle includes moving a vehicle using a set of maneuvers to park the vehicle in a parking space based on an estimated location of a curb. The example method also includes comparing a first yaw rate to a reference yaw rate to detect when the vehicle contacts the curb. The example method also includes moving the vehicle using an adjusted set of maneuvers based on an actual location of the curb.

A computer readable medium comprising instructions that, when executed, cause a vehicle to move using a set of maneuvers to park the vehicle in a parking space. The set of maneuvers are based on an estimated location of a curb. Additionally, the instructions, when executed, cause the vehicle to compare a first yaw rate to a reference yaw rate to detect when the vehicle contacts the curb. The instructions, when executed, also cause the vehicle to move using an adjusted set of maneuvers, the adjusted set of maneuvers based on detecting an actual location of the curb.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
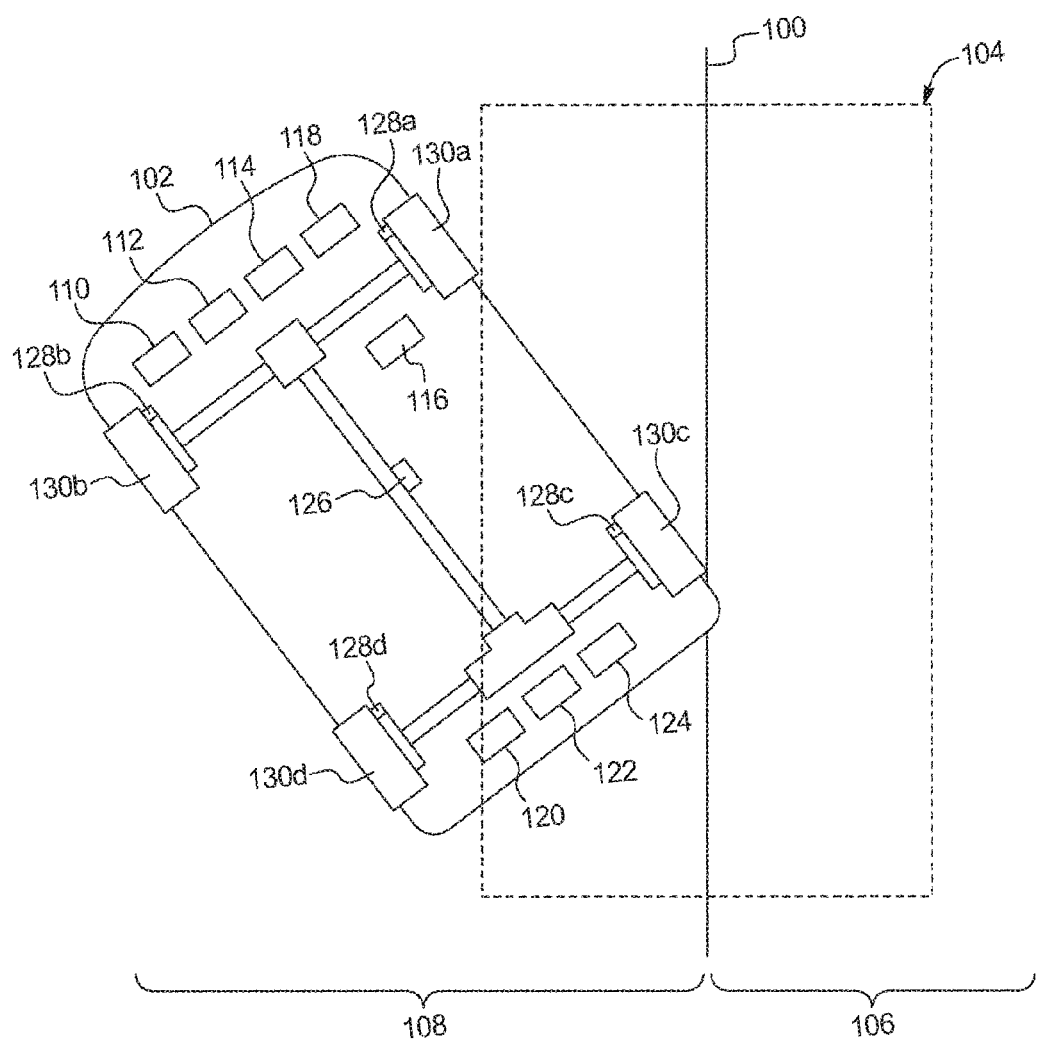
FIG. 1 illustrates detecting curbs in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles (such as, cars, trucks, vans, sport utility vehicles, etc.) are being manufactured with parking assist features that aid the driver with locating a potential parking spot with distance sensors (such as, ultra sonic sensors, RADAR, LiDAR, etc.) and/or visual sensors (such as, cameras, infrared sensors, etc.). Parking spaces involving curbs (such as, parking spaces that straddle the curb, parking spaces that have the vehicle park very close to the curb, parking spaces on the sidewalk, etc.) interfere with path planning, and lateral and longitudinal control tasks unless the existence of the curb is detected and compensated for. For example, if the system does not account for the climbing of a curb when planning the vehicle's path, the path could cause damage to the vehicle by allowing the vehicle's wheels to slide/slip off of the curb, or by contacting the curb at an improper angle. As another example, when the vehicle wheel climbs a curb, the distance traveled is not properly calculated via odometry. This leads to errors in the estimated vehicle position and heading angle. This can result in an unacceptable final position of the vehicle, or even unacceptable movement of the vehicle with regards to surrounding objects. Depending on the curb profile, height, material, and/or color, etc., detecting the curb with visual sensors can be difficult.

FIG. 1 illustrates detecting curbs 100 in accordance with the teachings of this disclosure. FIG. 1 illustrates a vehicle 102 encountering a curb 100 while autonomously maneuvering into a parking space 104. The example parking space 104 is straddling the curb 100. Alternatively, in some examples, the parking space 104 is entirely on a raised section 106 (such as a sidewalk) or on a street 108 close to the curb 100. The vehicle 102 is any type of road vehicle (e.g., cars, trucks, vans, sport utility vehicles, etc.). The vehicle 102 may be a standard gasoline powered vehicle, a hybrid vehicle, an electric vehicle, a fuel cell vehicle, or any other type of suitable vehicle. The vehicle 102 includes a powertrain with an engine, a transmission, a suspension, and a driveshaft. The vehicle 102 also includes standard features (not shown) such as a dashboard, adjustable seats, one or more batteries, an HVAC system including a compressor and electronic expansion valve, a windshield, doors, windows, seatbelts, airbags, and tires.

The vehicle 102 includes a parking assist system 110, steering control system 112, a throttle control system 114, a brake control system 116, and a curb detector 118. The parking assist system 110 detects the parking space 104 and plans a path to maneuver the vehicle 102 into the parking space 104. In the illustrated example, the parking assist system 110 is communicatively coupled to ultrasonic sensors 120, RADAR sensors 122, and/or LiDAR sensor 124. The ultrasonic sensors 120, the RADAR sensors 122, and/or the LiDAR sensor 124 detect the location and dimensions of objects (such as, other vehicles, trees, garbage cans, etc.) to define the parking space 104. The parking assist system 110 is communicatively coupled to the steering control system 112, the throttle control system 114, and the brake control system 116 to maneuver the vehicle 102 into the parking space 104.

The curb detector 118 is communicatively coupled to a yaw rate sensor 126 that measures the yaw rate of vehicle 102, a front right (FR) wheel speed sensor 128a that measures the speed of a front right wheel 130a, a front left (FL) wheel speed sensor 128b that measures the speed of a front left wheel 130b, a rear right (RR) wheel speed sensor 128c that measures the speed of a rear right wheel 130c, and a rear left (RL) wheel speed sensor 128d that measures the speed of a rear left wheel 130d. As discussed in more detail below, based on the measurements of the yaw rate sensor 126 and the wheel speed sensors 128a, 128b, 128c, and 128d, the curb detector 118 (a) detects when one of the wheels 130a, 130b, 130c, and 130d contacts the curb 100 and (b) identifies which one of the one of the wheels 130a, 130b, 130c, and 130d contacted the curb 100.

The parking assist system 110 tracks the position of the vehicle 102 based on the measurements from the wheel speed sensors 128a, 128b, 128c, and 128d and the yaw rate sensor 126. The parking assist system 110 is communicatively coupled to the curb detector 118. When one of the wheels 130a, 130b, 130c, and 130d contacts the curb 100, the curb detector 118 informs the parking assist system 110. The parking assist system 110 then recalculates the position of the vehicle 102 and/or replans the path of the vehicle 102 to enter the parking space 104. In some parking maneuvers, the vehicle 102 may contact the curb 100 more than once. For example, initially, the rear right wheel 130c may contact and/or climb the curb 100, followed by the front right wheel 130a contacting and/or climbing the curb 100. In such an example, the parking assist system 110 may replan the path of the vehicle 102 after each wheel 130a, 130b, 130c, and 130d contacts the curb 100. In some examples, the parking assist system 110 may replan the path based on the probable position at which the other wheel(s) 130a, 130b, 130c, and 130d will contact the curb 100.

Figure 2:
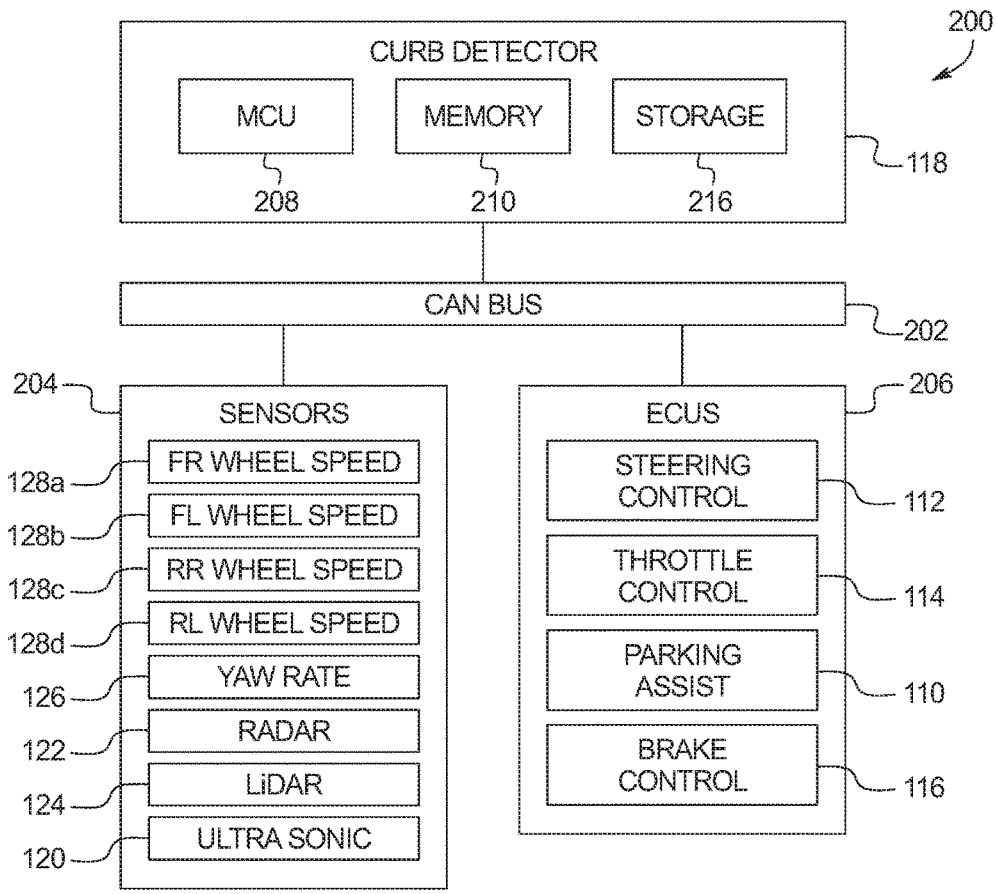
FIG. 2 is a block diagram illustrating electronic components of the vehicle of FIG. 1.

FIG. 2 is a block diagram illustrating electronic components 200 of the vehicle 102 FIG. 1. In some examples, the electronic components 200 of the curb detector 118 are incorporated into the parking assist system 110. The electronic components 200 include a controller area network (CAN) bus 202, example sensors 204, example electronic control units (ECUs) 206, and the curb detector 118. The CAN bus 202 communicatively couples the sensors 204, the ECUs 206, and other devices connected to the CAN bus 202. The CAN bus protocol is defined by International Standards Organization (ISO) 11898-1.

The sensors 204 may be arranged in and around the vehicle 102 in any suitable fashion. In the illustrated example, the sensors 204 include the ultrasonic sensors 120, the RADAR sensors 122, the LiDAR sensor 124, the yaw rate sensor 126, the FR wheel speed sensor 128a, the FL wheel speed sensor 128b, the RR wheel speed sensor 128c, and the RL wheel speed sensor 128d. In some examples, two to six ultrasonic sensors 120 are mounted to a front bumper and/or a rear bumper of the vehicle 102 to detect objects within a set range (such as, 1-meter (3.28 feet) range setting, a 3-meter (9.83 feet) range setting, etc.) along a front arc and/or a rear arc of the vehicle 102. The ultrasonic sensors 120 use high frequency sound waves. In some examples, RADAR sensors 122 are mounted to a front bumper and/or a rear bumper of the vehicle 102 to detect objects within a set range (such as, a 30-meter (98.3 feet) range setting, etc.) using electromagnetic waves. In some examples, a LiDAR sensor 124 is mounted to the roof of the vehicle to objects within a set range (such as, a 70-meter range setting, etc.) using infrared or ultraviolet light. The vehicle 102 may have any combination of the ultrasonic sensors 120, the RADAR sensors 122, and the LiDAR sensor 124 to detect the parking space 104 of FIG. 1.

The yaw rate sensor 126 is installed midway between a front axle and a rear axle of the vehicle 102. The yaw rate sensor 126 measures the angular velocity of the vehicle 102 around its vertical axis. The parking assist system 110 uses the measurements from the yaw rate sensor 126 to determine the orientation of the vehicle 102 while turning. The wheel speed sensors 128a, 128b, 128c and 128d are mounted on the wheel assembly of each of the wheels 130a, 130b, 130c, and 130d respectively. The wheel speed sensors 128a, 128b, 128c and 128d measure the rotational speed of the wheels 130a, 130b, 130c, and 130d. Using the yaw rate sensor 126 and the wheel speed sensors 128a, 128b, 128c and 128d, the parking assist system 110 monitors the position of the vehicle 102. Additionally, using the yaw rate sensor 126 and the wheel speed sensors 128a, 128b, 128c and 128d, the curb detector 118 detects when one of the wheels 130a, 130b, 130c, and 130d contacts and/or climbs the curb 100.

The ECUs 206 monitor and control the systems of the vehicle 102. The ECUs 206 communicate and exchange information via the CAN bus 202. Additionally, the ECUs 206 may communicate properties (such as, status of the ECU 206, sensor readings, control state, error and diagnostic codes, etc.) to and/or receive requests from other ECUs 206. For example, the parking assist system 110 may specify, via a message on the CAN bus 202, a throttle position for the throttle control system 114 to implement. Some vehicles 102 may have seventy or more ECUs 206 located in various locations around the vehicle 102 communicatively coupled by the CAN bus 202. The ECUs 206 (such as the steering control system 112, etc.) are discrete sets of electronics that include their own circuit(s) (such as integrated circuits, microprocessors, memory, storage, etc.) and firmware, sensors, actuators, and/or mounting hardware. In the illustrated example, the ECUs 206 include the parking assist system 110, the steering control system 112, the throttle control system 114, and the brake control system 116. The vehicle 102 may have different ECUs 206 than those listed. The steering control system 112 autonomously steers the vehicle 102 into the parking space 104 in conjunction the parking assist system 110. The throttle control system 114 and the brake control system 116 control the speed of the vehicle 102.

In the illustrated example of FIG. 2, the curb detector 118 includes a processor or controller 208, memory 210, and storage 212. The processor or controller 208 may be any suitable processing device or set of processing devices such as, but not limited to: a microprocessor, a microcontroller-based platform, a suitable integrated circuit, one or more field-programmable gate arrays (FPGAs), or one or more application-specific integrated circuits (ASICs). The memory 210 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 210 includes multiple kinds of memory, particularly volatile memory and non-volatile memory. The storage 212 may include, for example, a hard drive or a solid state drive.

The memory 210 and the storage 212 are a computer readable medium on which one or more sets of instructions for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the controller 208 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 3:
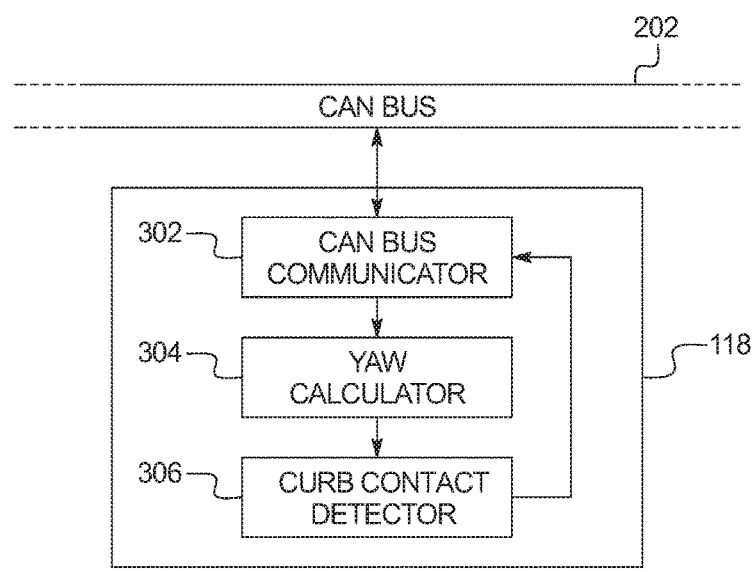
FIG. 3 illustrates an example implementation of the curb detector of FIG. 1.

FIG. 3 illustrates an example implementation of the curb detector 118 of FIG. 1. In the illustrated example, the curb detector 118 includes a CAN bus communicator 302, a yaw calculator 304, and a curb contact detector 306. The CAN bus communicator 302 is configured to communicate with the sensors 204 and the ECUs 206 via the CAN bus 202.

The yaw calculator 304 compares the yaw rate of the vehicle 102 as measured by the yaw rate sensor 126 and yaw rate experienced by the wheels 130a, 130b, 130c, and 103d. As the vehicle 102 turns, the inside wheels (such as, the front right wheel 130a and the rear right wheel 130c) travel at a lower speed than the outside wheels (such as, the front left wheel 130b and the rear left wheel 130d). This difference in speed, as measured by the wheel speed sensors 128a, 128b, 128c, and 128d, is used to calculate the rate of change in the heading angle of the vehicle 102. When one of the wheels 130a, 130b, 130c, and 103d contacts and/or climbs the curb 100, the speed of that one of the wheels 130a, 130b, 130c, and 103d changes. This affects the rate of change as calculated using the speed measurements from the wheel speed sensors 128a, 128b, 128c, and 128d.

To calculate the rate of change, the yaw calculator 304 calculates a rear wheel speed differential ($\Psi_{RW}$), and a front wheel speed differential ($\Psi_{FW}$). The rear wheel speed differential ($\Psi_{RW}$) is calculated in accordance with Equation (1) below.

$$\Psi_{RW} = \frac{(V_{RL} - V_{RR}) \times R_w}{tw_R} \quad \text{Equation (1)}$$

In Equation (1) above, $V_{RL}$ is the wheel speed (in radians per second) of the rear left wheel 130d as measured by the RL wheel speed sensor 128d, $V_{RR}$ is the wheel speed (in radians per second) of the rear right wheel 130c as measured by the RR wheel speed sensor 128c, $R_w$ is radius of the wheels 130c and 130d (in meters), and $tw_R$ is the track width of the rear axle of the vehicle. The front wheel speed differential ($\Psi_{FW}$) is calculated in accordance with Equation (2) below $$\Psi_{FW} = \frac{(V_{FL} - V_{FR}) \times R_w}{tw_F \times \cos\delta} \quad \text{Equation (2)}$$

In Equation (2) above, $V_{FL}$ is the wheel speed (in radians per second) of the front left wheel 130b as measured by the FL wheel speed sensor 128b, $V_{FR}$ is the wheel speed (in radians per second) of the front right wheel 130a as measured by the FR wheel speed sensor 128a, $R_w$ is radius of the wheels 130a and 130b (in meters), $tw_F$ is the track width of the front axle of the vehicle, and $\delta$ is the road wheel steering angle. The road wheel steering angle ($\delta$) is the angle of the wheels (e.g., the front right wheel 130a and the front left wheel 130b) when the vehicle 102 is turning. In some examples, the road wheel steering angle ($\delta$) is measured by the steering control system 112.

Figure 4B:
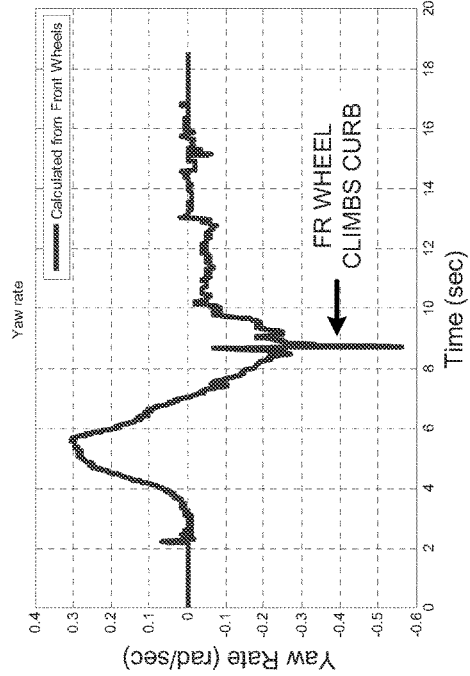
FIGS. 4A, 4B, and 4C depict graphs of yaw rates of the vehicle of FIG. 1 when detecting curbs.
Figure 4A:
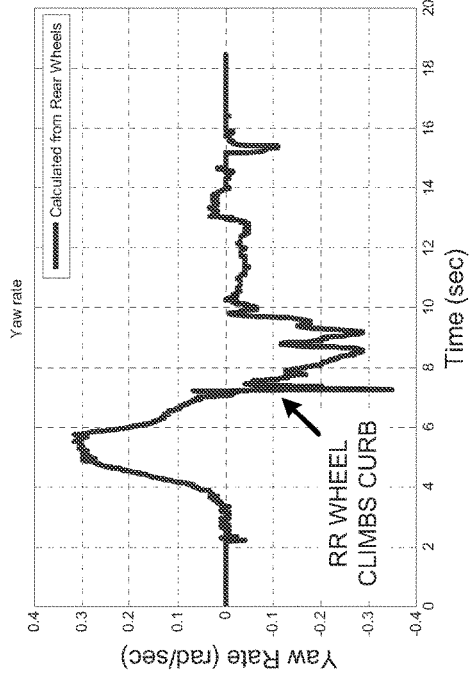
Figure 4C:
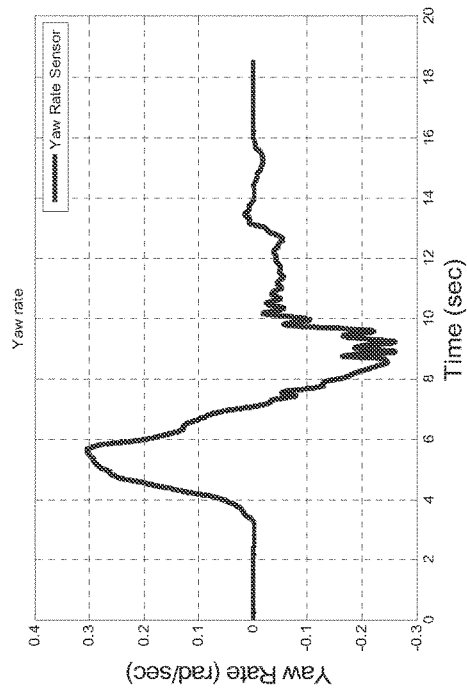

FIGS. 4A, 4B, and 4C depict graphs of example yaw rates of the vehicle 102 of FIG. 1 when detecting curbs 100. FIG. 4A depicts an example graph of the rear wheel speed differential ($\Psi_{RW}$) calculated by the yaw calculator 304. Additionally, FIG. 4A depicts the rear wheel speed differential ($\Psi_{RW}$) when the rear right wheel 130c climbs the curb 100. FIG. 4B depicts an example graph of the front wheel speed differential ($\Psi_{FW}$) calculated by the yaw calculator 304. Additionally, FIG. 4B depicts the front wheel speed differential ($\Psi_{FW}$) when the front right wheel 130a climbs the curb 100. FIG. 4C depicts an example graph of a reference yaw rate ($\Psi_{REF}$) measured by the yaw rate sensor 126.

Returning to FIG. 3, the yaw rate sensor 126 measures the reference yaw rate ($\Psi_{REF}$). The yaw calculator 304 compares the reference yaw rate ($\Psi_{REF}$) measured by the yaw rate sensor 126 to the rear wheel speed differential ($\Psi_{RW}$) and the front wheel speed differential ($\Psi_{FW}$) to calculate a rear wheel yaw rate difference ($\Delta\Psi_{RW}$) and a front wheel yaw rate difference ($\Delta\Psi_{FW}$), respectively. The rear wheel yaw rate difference ($\Delta\Psi_{RW}$) is calculated in accordance with Equation (3) below. The front wheel yaw rate difference ($\Delta\Psi_{FW}$) is calculated in accordance with Equation (4) below.

$$\Delta\Psi_{RW} = \Psi_{REF} - \Psi_{RW} \quad \text{Equation (3)}$$

$$\Delta\Psi_{FW} = \Psi_{REF} - \Psi_{FW} \quad \text{Equation (4)}$$

In some examples, the vehicle 102 does not include the yaw rate sensor 126. In some such examples, the yaw calculator 304 compares the rear wheel speed differential ($\Psi_{RW}$) to the front wheel speed differential ($\Psi_{FW}$) to calculate a rear wheel yaw rate difference ($\Delta\Psi_{RW}$) and a front wheel yaw rate difference ($\Delta\Psi_{FW}$) The rear wheel yaw rate difference ($\Delta\Psi_{RW}$) is calculated in accordance with Equation (5) below. The front wheel yaw rate difference ($\Delta\Psi_{FW}$) is calculated in accordance with Equation (6) below.

$$\Delta\Psi_{RW} = \Psi_{FW} - \Psi_{RW} \quad \text{Equation (5)}$$

$$\Delta\Psi_{FW} = \Psi_{RW} - \Psi_{FW} \quad \text{Equation (6)}$$

If the wheels 130a, 130b, 130c, and 130d are moving as expected (e.g., not contacting and/or climbing the curb 100), the rear wheel yaw rate difference ($\Delta\Psi_{RW}$) and the front wheel yaw rate difference ($\Delta\Psi_{FW}$) are small. In such a scenario, measurement noise and/or tire imperfections may contribute to the rear wheel yaw rate difference ($\Delta\Psi_{RW}$) and/or the front wheel yaw rate difference ($\Delta\Psi_{FW}$) being a non-zero value. When one of the wheels 130a, 130b, 130c and 130d climbs over the curb 100, its corresponding wheel speed will increase in order to travel in the vertical direction. This increase in wheel speed will cause difference in the corresponding yaw rate calculation.

Figure 5A:
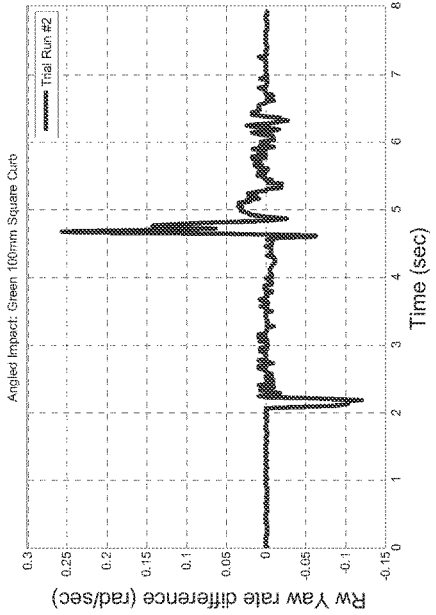
FIGS. 5A, 5B, and 5C depict graphs of yaw rate differences between the wheels and the vehicle of FIG. 1.
Figure 5B:
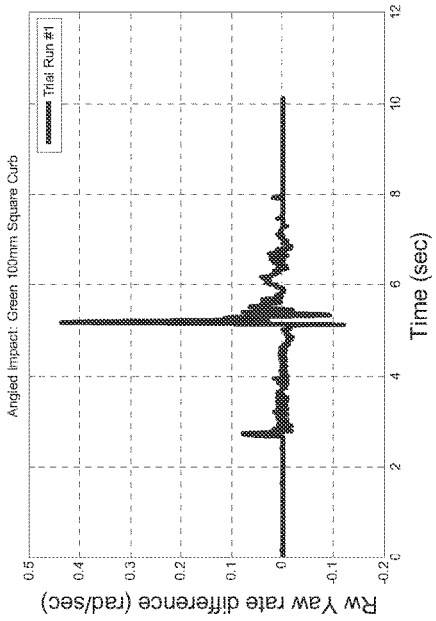
Figure 5C:
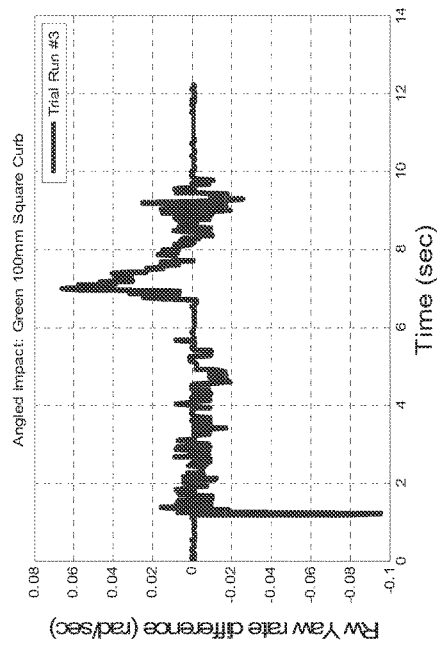

FIGS. 5A, 5B, and 5C depict example graphs of the rear wheel yaw rate difference ($\Delta\Psi_{RW}$). FIG. 5A depicts an example graph of the rear wheel yaw rate difference ($\Delta\Psi_{RW}$) when the vehicle 102 is traveling at a fast speed. FIG. 5B depicts an example graph of the rear wheel yaw rate difference ($\Delta\Psi_{RW}$) when the vehicle 102 is traveling at a moderate speed. FIG. 5C depicts an example graph of the rear wheel yaw rate difference ($\Delta\Psi_{RW}$) when the vehicle 102 is traveling at a slow speed.

Returning to FIG. 3, the curb contact detector 306 compares the rear wheel yaw rate difference ($\Delta\Psi_{RW}$) and the front wheel yaw rate difference ($\Delta\Psi_{FW}$) to a yaw rate threshold to determine when the one of the rear wheels 130c and 130d or one of the front wheels 130a and 130b contact and/or climb the curb 100, respectively. In some examples, curb contact detector 306 normalizes the rear wheel yaw rate difference ($\Delta\Psi_{RW}$) and the front wheel yaw rate difference ($\Delta\Psi_{FW}$) to the speed of the vehicle 102 before them to the yaw rate threshold. The normalized rear wheel yaw rate difference ($\Psi_{nRW}$) is calculated in accordance with Equation (7) below. The normalized front wheel yaw rate difference ($\Psi_{nFW}$) is calculated in accordance with Equation (8) below.

$$\Psi_{nRW} = \frac{\Delta\Psi_{RW}}{V_S} \quad \text{Equation (7)}$$

$$\Psi_{nFW} = \frac{\Delta\Psi_{FW}}{V_S} \quad \text{Equation (8)}$$

In Equation (7) and Equation (8) above, $V_S$ is the speed of the vehicle 102.

Figure 6A:
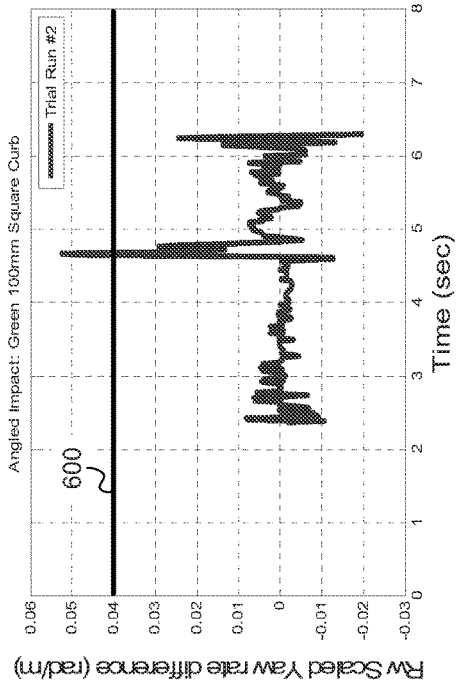
FIGS. 6A, 6B, and 6C depict graphs of normalized yaw rate differences between the wheels and the vehicle of FIG. 1.
Figure 6B:
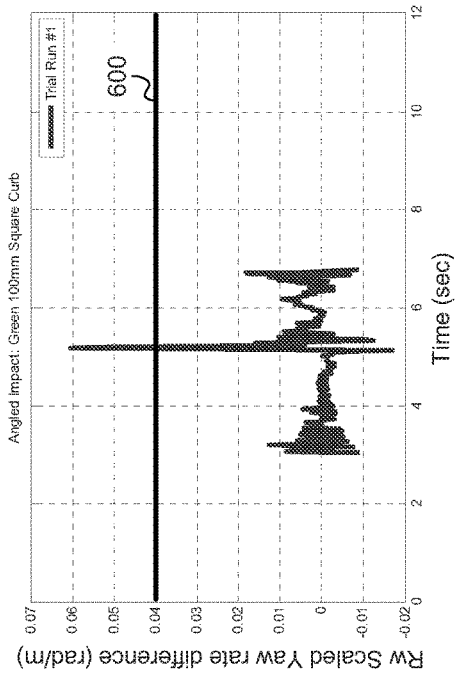
Figure 6C:
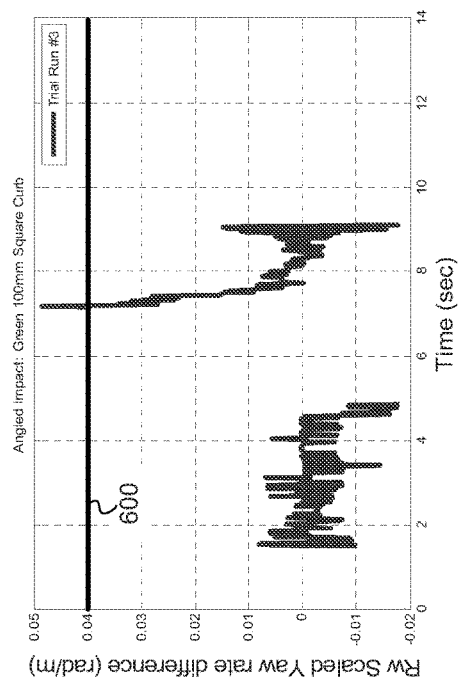

FIGS. 6A, 6B, and 6C depict example graphs of the normalized rear wheel yaw rate difference ($\Psi_{nRW}$) when the curb contact detector 306 is detecting when the vehicle 102 contacts and/or climbs the curb 100. The graphs depicted in FIGS. 6A, 6B, and 6C do not show the normalized rear wheel yaw rate difference ($\Psi_{nRW}$) when the speed ($V_S$) of the vehicle 102 is zero. FIG. 6A corresponds to the rear wheel yaw rate difference ($\Delta\Psi_{RW}$) of FIG. 5A when the vehicle 102 is traveling at a fast speed. FIG. 6B corresponds to the rear wheel yaw rate difference ($\Delta\Psi_{RW}$) of FIG. 5B when the vehicle 102 is traveling at a moderate speed. FIG. 6C corresponds to the rear wheel yaw rate difference ($\Delta\Psi_{RW}$) of FIG. 5C when the vehicle 102 is traveling at a slow speed. Additionally, FIGS. 6A, 6B, and 6C depict the yaw rate threshold 600. The yaw rate threshold 600 is selected to minimize false positives due to noise and to maximize curb detection. In the illustrated examples, the yaw rate threshold 600 is 0.04 radians per meter.

Returning to FIG. 3, in response to the normalized rear wheel yaw rate difference ($\Psi_{nRW}$) and/or the normalized front wheel yaw rate difference ($\Psi_{nFW}$) satisfying (e.g., greater than or equal to) the yaw rate threshold, the curb contact detector 306 informs the parking assist system 110, via the CAN bus communicator 302, (a) that one of the wheels 130a, 130b, 130c, and 130d made contact and/or climbed the curb 100, and (b) which one of the wheels 130a, 130b, 130c, and 130d made contact and/or climbed the curb 100. The curb contact detector 306 determines which one of the wheels 130a, 130b, 130c, and 130d made contact and/or climbed the curb 100 based on which one of the normalized wheel yaw rate differences (e.g., the normalized rear wheel yaw rate difference ($\Psi_{nRW}$) or the front wheel yaw rate difference ($\Psi_{nFW}$)) that satisfied the yaw rate threshold (e.g., the yaw rate threshold 600 of FIGS. 6A, 6B, and 6C) and the direction the vehicle 102 is turning. For example, the curb contact detector 306 may determine that the rear right wheel 130c contacted and/or climbed the curb 100.

Figure 7:
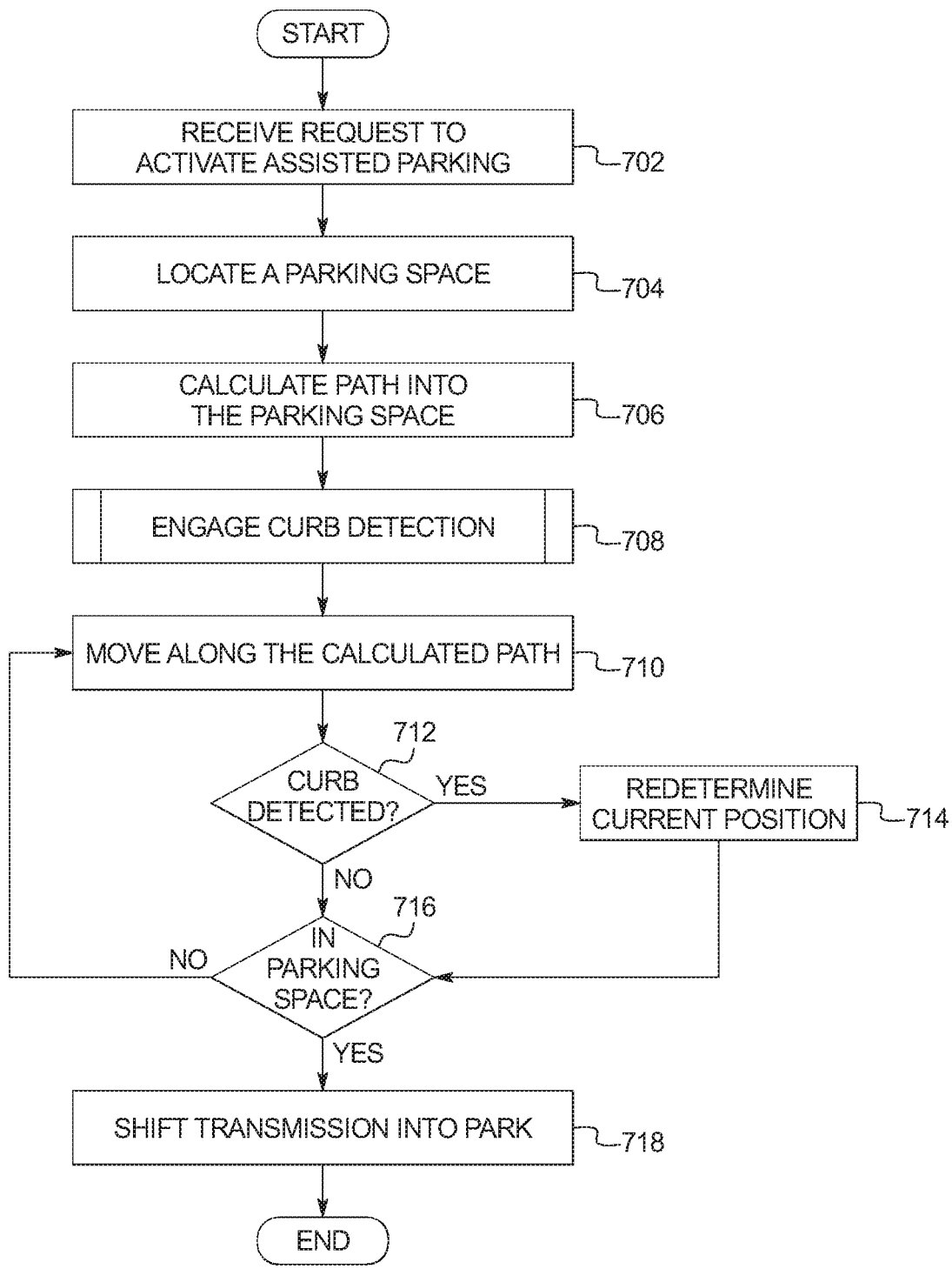
FIG. 7 is a flowchart of an example method to detect curbs during assisted parking that may be implemented by the electronic components of FIG. 2.

FIG. 7 is a flowchart of an example method to detect curbs 100 during assisted parking that may be implemented by the electronic components 200 of FIG. 2. Initially, the parking assist system 110 receives a request to activate assisted parking (block 702). The parking assist system 110 locates a parking space 104 (block 704). The parking assist system 110 may use the ultrasonic sensors 120, the RADAR sensors 122 and/or the LiDAR sensor 124 to detect a parking space 104 in the proximity of the vehicle 102 that (i) is large enough to accommodate the vehicle 102, and (ii) for which there is a viable path to maneuver the vehicle 102 into. The parking assist system 110 calculates a path (e.g. determines a set of maneuvers) to maneuver the vehicle 102 into the parking space 104 (block 706). In some examples, the parking assist system 110 may estimate a probable location of the curb 100 based on, for example, the detected objects around the parking space 104.

The parking assist system 110 communicates (e.g., via the CAN bus 214) to the curb detector 118 to start detecting the curb 100 (block 708). An example method to detect the curb 100 is disclosed in connection with FIG. 8 below. The parking assist system 110 moves the vehicle 102 along the path calculated at block 706 (block 710). When moving the vehicle 102 along the path, the parking assist system 110 monitors the position of the vehicle 102 using odometry and/or dead reckoning. For example, the parking assist system 110 may receive the measurements, via the CAN bus 202, from the wheel speed sensors 128a, 128b, 128c and 128d, and calculate the position of the vehicle 102 using the speeds of the wheels 130a, 130b, 130c, 130d.

The parking assist system 110 determines whether one of the wheels 130a, 130b, 130c, 130d has contacted and/or climbed the curb 100 (block 712). The parking assist system 110 determines whether one of the wheels 130a, 130b, 130c, 130d has contacted and/or climbed the curb 100 based on message received from the curb detector 118. The message includes which set of wheels (such as the front wheels 130a and 130b or the rear wheels 130c and 130d). In some examples, the message also includes which one of the wheels 130a, 130b, 130c, 130d contacted and/or climbed the curb 100. Alternately, in some examples, the parking assist system 110 infers which one of the wheels 130a, 130b, 130c, 130d contacted and/or climbed the curb 100 based on which set of wheels contacted and/or climbed the curb 100 and which direction the vehicle 102 is moving.

If the parking assist system 110 determines that one of the wheels 130a, 130b, 130c, 130d has contacted and/or climbed the curb 100, the parking assist system 110 redetermines the current position of the vehicle 102 (block 714). In some examples, the parking assist system 110 also recalculates the path (e.g. adjusts the set of maneuvers) based on location of the curb 100. If the parking assist system 110 does not that detect that one of the wheels 130a, 130b, 130c, 130d has contacted and/or climbed the curb 100, the parking assist system 110 determines whether the vehicle 102 is in the parking space 104 (block 716). If the parking assist system 110 determines the vehicle 102 is in the parking space 104, the parking assist system 110 causes the transmission of the vehicle 102 to be shifted into park (block 718). The parking assist system 110 may also alert the occupants of the vehicle 102. Otherwise, if the parking assist system 110 determines the vehicle 102 is not in the parking space 104, the parking assist system 110 continues to moved the vehicle 102 along the path calculated at block 706 or recalculated at block 714 (block 710).

Figure 8:
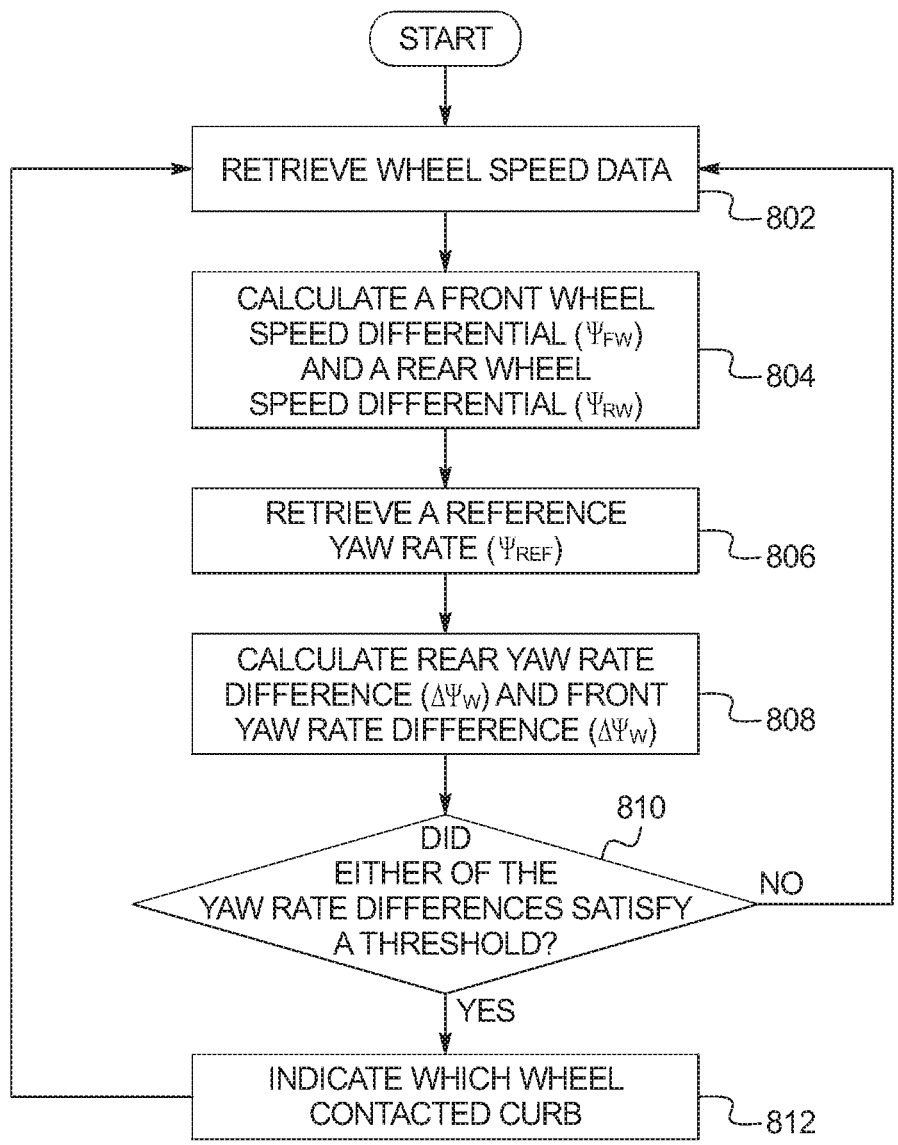
FIG. 8 is a flowchart of an example method to detect curbs that may be implemented by the electronic components of FIG. 2.

FIG. 8 is a flowchart of an example method to detect curbs 100 by the curb detector 118 that may be implemented by the electronic components 200 of FIG. 2. Initially, the curb detector 118 receives or otherwise retrieves (via the CAN bus 202) the measurements from the wheel speed sensors 128a, 128b, 128c, and 128d (block 802). The curb detector 118 calculates the rear wheel speed differential ($\Psi_{RW}$) and the front wheel speed differential ($\Psi_{FW}$) based on the measurements retrieved at block 802 (block 804). In some examples, the rear wheel speed differential ($\Psi_{RW}$) and the front wheel speed differential ($\Psi_{FW}$) are calculated in accordance with Equation (1) and Equation (2) above. The curb detector 118 receives or otherwise retrieves measurements from the yaw rate sensor 126 to determine the reference yaw rate ($\Psi_{REF}$) (block 806).

The curb detector 118 calculates the rear wheel yaw rate difference ($\Delta\Psi_{RW}$) and the front wheel yaw rate difference ($\Delta\Psi_{FW}$) or the normalized rear wheel yaw rate difference ($\Psi_{nRW}$) and the normalized front wheel yaw rate difference ($\Psi_{nFW}$) (block 808). In some examples, the rear wheel yaw rate difference ($\Delta\Psi_{RW}$) and the front wheel yaw rate difference ($\Delta\Psi_{FW}$) are calculated in accordance with Equation (3) and Equation (4) above. Alternatively, in some examples, the rear wheel yaw rate difference ($\Delta\Psi_{RW}$) and the front wheel yaw rate difference ($\Delta\Psi_{FW}$) are calculated in accordance with Equation (5) and Equation (6) above. In some examples, the curb detector 118 additionally calculates the normalized rear wheel yaw rate difference ($\Psi_{nRW}$) and the normalized front wheel yaw rate difference ($\Psi_{nFW}$) in accordance with Equation (7) and Equation (8) respectively above.

The curb detector 118 compares the rear wheel yaw rate difference ($\Delta\Psi_{RW}$ or $\Psi_{nRW}$) and the front wheel yaw rate difference ($\Delta\Psi_{FW}$ or $\Psi_{nFW}$) to the yaw rate threshold (block 810). If either the rear wheel yaw rate difference ($\Delta\Psi_{RW}$ or $\Psi_{nRW}$) or the front wheel yaw rate difference ($\Delta\Psi_{FW}$ or $\Psi_{nFW}$) satisfy the yaw rate threshold 600, the curb detector 118 indicates to the parking assist system 110 which one of the wheels 130a, 130b, 130c, and 130d contacted and/or climbed the curb 100 (block 812). Otherwise, if neither the rear wheel yaw rate difference ($\Delta\Psi_{RW}$ or $\Psi_{nRW}$) nor the front wheel yaw rate difference ($\Delta\Psi_{FW}$ or $\Psi_{nFW}$) satisfy the yaw rate threshold 600, the curb detector 118 continues to monitor the wheel speed sensors 128a, 128b, 128c, and 128d (block 802).

The flowcharts of FIGS. 7 and/or 8 are representative of machine readable instructions that comprise one or more programs that, when executed by a processor (such as the processor 208 of FIG. 2), cause the vehicle 102 to implement the parking assist system 110 and/or the curb detector 118 of FIG. 1. Further, although the example programs are described with reference to the flowcharts illustrated in FIGS. 7 and/or 8, many other methods of implementing the example parking assist system 110 and/or example the curb detector 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   wheel speed sensors;
   a curb detector configured to compare a first yaw rate to a reference yaw rate to physically detect an actual location of a curb based on measurements from the wheel speed sensors; and
   a steering control system configured to:
   before detecting the curb, maneuver the vehicle into a parking space based on an estimated location of the curb; and
   in response to detecting the curb, maneuver the vehicle into the parking space based on the actual location of the curb.

2. The vehicle of claim 1, including a yaw rate sensor configured to measure the reference yaw rate of the vehicle.

3. The vehicle of claim 1, wherein the wheel speed sensors include first wheel speed sensors configured to measure speeds of wheels associated with a first axle of the vehicle; and wherein the curb detector is configured to calculate the first yaw rate based on measurements from the first wheel speed sensors.

4. The vehicle of claim 3, wherein the wheel speed sensors include second wheel speed sensors configured to measure speeds of wheels associated with a second axle of the vehicle; and wherein the curb detector is configured to calculate the reference yaw rate based on measurements from the second wheel speed sensors.

5. The vehicle of claim 1, wherein the curb detector is configured to determine that the vehicle contacts the curb when a difference between the reference yaw rate and the first yaw rate satisfies a threshold.

6. The vehicle of claim 1, wherein when comparing the first yaw rate to the reference yaw rate, the curb detector detects when one of a first set of wheels associated with a rear axle of the vehicle contacts the curb, and wherein the curb detector is configured to:
  compare a second yaw rate to the reference yaw rate to detect when one of a second set of wheels associated with a front axle of the vehicle contacts the curb; and
  when the vehicle contacts the curb, determine which one of the wheels contacted the curb based on the reference yaw rate, the first yaw rate and the second yaw rate.

7. A vehicle parking assist system comprising:
  wheel speed sensors;
  a processor;
  a program stored in memory configured to:
    move a vehicle using a set of maneuvers to park the vehicle in a parking space based on an estimated location of a curb;
    compare a first yaw rate to a reference yaw rate to detect when the vehicle physically contacts the curb based on measurements from the wheel speed sensors; and
    move the vehicle using an adjusted set of maneuvers based on an actual location of the curb.

8. The parking assist system of claim 7, including a yaw rate sensor to measure the reference yaw rate of the vehicle.

9. The parking assist system of claim 7, wherein the wheel speed sensors include first wheel speed sensors configured to measure speeds of wheels associated with a first axle of the vehicle; and wherein the program stored in the memory is configured to calculate the first yaw rate based on measurements from the first wheel speed sensors.

10. The parking assist system of claim 9, including wherein the wheel speed sensors include second wheel speed sensors configured to measure speeds of wheels associated with a second axle of the vehicle; and wherein the program stored in the memory is configured to calculate the reference yaw rate based on measurements from the second wheel speed sensors.

11. The parking assist system of claim 7, wherein the program stored in the memory is configured to determine that the vehicle contacts the curb when a difference between the reference yaw rate and the first yaw rate satisfies a threshold.

12. The parking assist system of claim 7, wherein comparing the first yaw rate to the reference yaw rate detects when one of a first set of wheels associated with a rear axle of the vehicle contacts the curb, and wherein the program stored in the memory is configured to:
  compare a second yaw rate to the reference yaw rate to detect when one of a second set of wheels associated with a front axle of the vehicle contacts the curb; and
  when the vehicle contacts the curb, determine which one of the wheels contacted the curb based on the reference yaw rate, the first yaw rate and the second yaw rate.

13. A method comprising:
  moving a vehicle along a calculated path to park the vehicle in a parking space based on an estimated location of a curb;
  comparing, with a processor, a first yaw rate to a reference yaw rate to detect when a wheel of the vehicle physically contacts the curb based on measurements from wheel speed sensors; and
  changing the calculated path to account for on an actual location of the curb.

14. The method of claim 13, including calculating the reference yaw rate based on measurements from a yaw rate sensor.

15. The method of claim 13, including calculating the first yaw rate based on measurements from at least one of the wheel speed sensors associated with a first axel of the vehicle.

16. The method claim 15, including calculating the reference yaw rate based on measurements from at least one of the wheel speed sensors associated with a second axel of the vehicle.

17. The method of claim 13 including estimating a location of the curb based on objects around the parking space detected by at least one of an ultrasonic sensor, a RADAR sensor, or a LiDAR sensor.

* * * * *